July 20, 1965 J. BORDEAUX ETAL 3,195,579
FLOW CONTROL
Filed Nov. 15, 1961 2 Sheets-Sheet 1
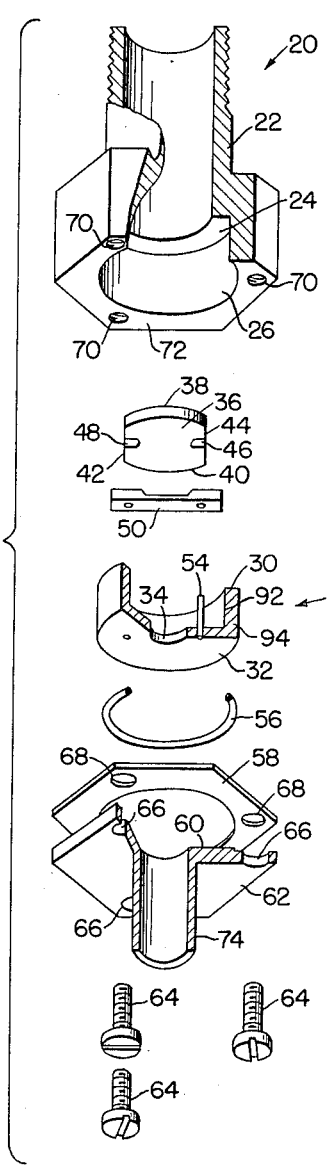
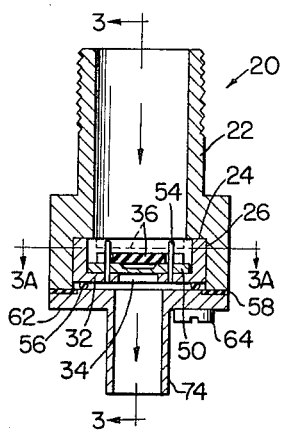
FIG-2
FIG-3
FIG-3A
FIG-4
FIG-1
INVENTORS
JEAN BORDEAUX
DENNIS D. RENK
BY
Robert R Cantor
ATTORNEY July 20, 1965   J. BORDEAUX ETAL   3,195,579
FLOW CONTROL
Filed Nov. 15, 1961   2 Sheets-Sheet 2

INVENTORS
JEAN BORDEAUX
DENNIS D. RENK
BY Robert R Candor
ATTORNEY

United States Patent Office 3,195,579
Patented July 20, 1965

3,195,579
FLOW CONTROL
Jean Bordeaux, Santa Ana, and Dennis D. Renk, Anaheim, Calif., assignors to Robertshaw Controls Company, a corporation of Delaware
Filed Nov. 15, 1961, Ser. No. 152,541
15 Claims. (Cl. 138—43)

This invention relates to improvements in flow control.

According to this invention an improved flow control means and method are provided whereby a desired fluid flow discharge rate is obtained at the outlet of the controller regardless of relatively large variations of fluid pressures at the inlet of the flow controller.

A simplified form of flow control is provided in which the controlling member may be cut from sheet stock of elastic material, such as rubber, synthetic rubber, or similar elastic materials producing a substantially similar result. The controlling member need not be made in a manner to produce a precision molded elastomer. Instead, it may be economically cut or otherwise formed from sheet stock, if desired, as above indicated.

The control member so cut or otherwise made is able to respond quickly to relatively great deformations caused by high inlet fluid pressures. Low hysteresis charactertistics are provided.

A flexible control member is provided having a fluid blocking central part and fluid flow controlling periphery. The fluid blocking central part and a portion of the periphery are supported in spaced relationship to a fluid control plate and a flow opening in said plate. The central part and/or another portion of the periphery are pressed downwardly in response to varying fluid pressures in the inlet portion or flow control chamber of the controller to vary the flow resistance of the fluid flow path or paths under said control member.

The various components of the controller are so shaped that they may be readily assembled in a simple manner to produce an effective controller.

The casing of the controller is assembled and sealed in an effective and economical manner.

Accordingly it is an object of this invention to provide a flow control apparatus having one or more of the features herein disclosed.

Another object of this invention is to provide a flow control method having one or more of the features herein disclosed.

Other objects are apparents from this description and from the accompanying drawings in which:

FIGURE 1 is an exploded isometric view of one embodiment of the invention.

FIGURE 2 is a longitudinal cross section of the parts of FIGURE 1 assembled together.

FIGURE 3 is a cross section similar to FIGURE 2, but taken along the line 3—3 of FIGURE 2.

FIGURE 3A is a cross section along line 3A—3A of FIGURE 2.

FIGURE 4 is a diagrammatic view showing the assembly of two of the embodiments of FIGURE 1, together with a mixing chamber and a check valve.

Figure 5:
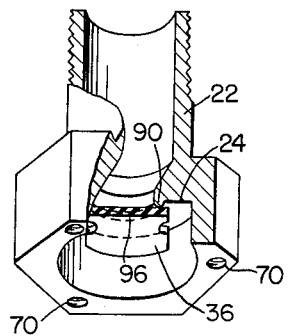
FIGURE 5 shows another embodiment of the inlet fitting of FIGURE 1 to enable the flow control member to act as a check valve when the flow of fluid to the fitting is reversed.

Certain words are used in this application which indicate direction, relative position, etc. However, these words are used for the sake of brevity and clearness, and are intended to be applied only to the disclosures in the drawings. However, it is to be understood that the actual devices to be made and used may have other directions and other relative positions than those indicated in this application. Examples of these words are "above," "below," "horizontal," "vertical," etc.

Referring first to FIGURES 1, 2, 3, and 3A, this invention may include an inlet fitting 20. This fitting may have an inlet passageway or pipe 22, an inlet shoulder 24 at the end of the pipe 20, and an enlarged passageway 26.

An inner, cup-shaped body 28 may have a rim 30 and a bottom plate 32. The cup-shaped body 28 may be telescoped within the enlarged passageway 26 with the rim of the cup 30 engaging the shoulder 24 of the inlet fitting. The cup 28 may have a fluid flow opening 34 in its bottom plate 32.

A flow control member or washer 36 may be a die cut member cut from sheet stock material into any suitable shape. For example, the washer may have circular arcs 38 and 40, which may be portions of a single circle, if desired. Segmental or straight cuts 42 and 44 may form the sides of the washer. Suitable notches or apertures 46 and 48 may be provided at or adjacent to the sides 42 and 44, for a purpose to become apparent.

The washer 28 and the stock material from which it may be cut may be an elastomer construction, made of rubber, synthetic rubber, or any other suitable elastic material producing substantially the same result.

A flow control washer supporting bar 50 may be placed in the cup 28 so it extends across the bottom 32 and/or across the opening 34. The bar 50 may be of less width than the opening 34, to provide four flow paths or openings 52 extending along the undersurface of the washer 36.

The bottom plate 32 of cup 28 may carry two pins 54 which enter the notches or apertures 46 and 48 to hold the washer 36 against rotation.

The fluid blocking, central part of the flow control washer 36 extends across the supporting bar 50 and is spaced from the bottom plate 30 and opening 34 and has a portion or portions of its periphery, such as the ends 38 and 40 bendable toward the bottom plate 32 in response to fluid pressure of fluid entering the inlet pipe 22.

The washer 36 may be oblong and may have the curved or circular ends 38 and 40 and sides 42 and 44, which may be straight. The said ends 38 and 40 may form the portion of the periphery that bends toward the bottom plate 32 in response to varying pressures of the fluid entering through the inlet 22.

A flexible resilient rubber-like O-ring 56 may be placed against the bottom plate 32 and may be engaged and pushed inwardly by the gasket 58 and/or the central part 60 of the outlet end piece 62. The gasket 58, and the outlet piece 62 may be bolted to the inlet fitting 20 by means of the screw bolts 64 which may pass through the openings 66, 68, and into the threaded openings 70 to engage the gasket 58 against the end wall 72 of the fitting 20. The resilient O-ring 56 pushes the cup and the rim 30 against the shoulder 24. The outlet end piece 62 carries the outlet pipe or passageway 74. A completely sealed casing is formed by the inlet fitting 20 and the outlet end piece 62, with the gasket 58, when these parts are bolted together.

The construction is such that the washer 36 bends more and more, as the fluid pressure in the inlet pipe 22 increases, to reduce the size of the passageways or openings 52 and thus to provide greater resistance to the flow of fluid into the opening 34 and from thence to the outlet 74.

The elasticity and size of the washer 36 may be chosen to control the flow of fluid, such as water and the like, in the desired manner. It may be desired only to reduce the velocity of flow to a substantially less amount than would be produced in the absence of the washer 36. The washer may also variably resist the flow of fluid in response to fluid pressures at the inlet and in the control chamber formed by cup 28, so the pressures at the opening 34 tend to be generally constant, within practical limits, as desired.

Figure 6:
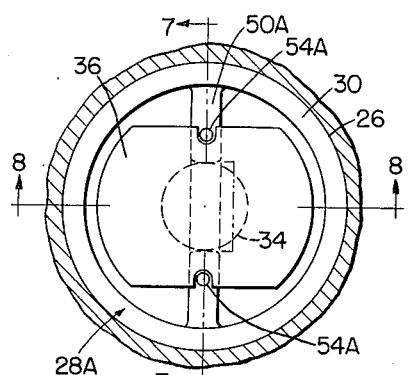
FIGURE 6 is a transverse cross section of another embodiment of this invention, and taken along the line 6—6 of FIGURE 8.
Figure 7:
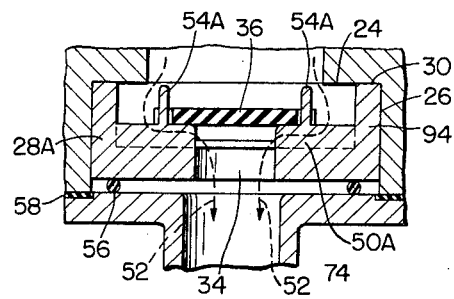
FIGURE 7 is a longitudinal cross section taken along the line 7—7 of FIGURE 6.
Figure 8:
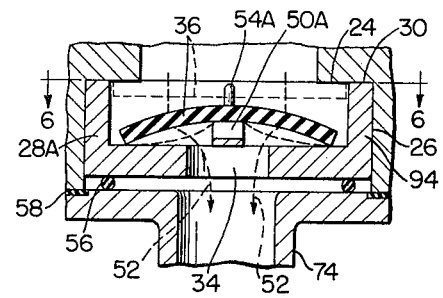
FIGURE 8 is a longitudinal cross section taken along the line 8—8 of FIGURE 6.

The embodiments of FIGURES 1-3A and/or FIGURES 6, 7, and 8 may be used in pairs to control the flow of cold water filling the tub of a domestic washing machine or the like. For example, in FIGURE 4, a cold water pipe 80 and a hot water pipe 82 may be connected to pressure flow control valves A and B which may be substantially identical with the embodiment of FIGURES 1, 2, 3A, and/or 6, 7 and 8. The flow control valves A and B may be connected to the discharge pipes C and D, which in turn discharge into a mixing member E which then discharges into a water supply pipe F, which discharges into the tub of the washing machine, or any other desired place.

Suitable cold and hot water shut off valves, not shown, may be provided respectively in pipes 80 and 82, manually or automatically to turn on and off the cold and hot water in a known manner.

Sometimes the water pressure in the hot water pipe 82 falls to an undesirably low pressure when compared to a higher pressure in the cold water pipe 80, or vice versa. Sometimes the pressure differential is too great, that cold water, for example, is caused to flow backwardly into the hot water pipe 82. To prevent this, a check valve 84 may be provided, which may have a casing 86, and which prevents such backward or reverse flow, which otherwise would follow the path of the arrows 88 in the hot water pipe 82. However, ordinarily the hot water flows downwardly in pipe 82 and not as indicated by the arrows 88.

According to the embodiments disclosed in FIGURES 5 and 9, the flow control member or washer 36 may cooperate with means to cause the washer 36 to operate as a check valve when the backward flow 88, described in connection with FIGURE 4 occurs. With the use of the embodiments of FIGURES 5 and 9, the check valve 84 of FIGURE 4 may be omitted while still retaining the checking feature of check valve 84 to prevent any backward flow of water in the hot water pipe 82 (or the cold water pipe, as the case may be) or in any other pipe which is likely to have a backward pressure produced in it.

Figure 9:
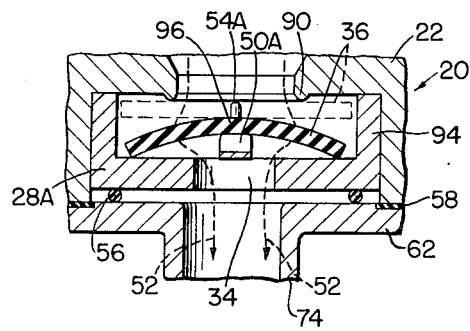
FIGURE 9 is a cross section similar to FIGURE 8, but showing another embodiment, in which means are provided for permitting the flow control member to act as a check valve when the fluid tends to reverse its direction.

To accomplish this built in check valve feature, a valve seat 90, in FIGURES 5 and 9, may be provided, which extends beyond the shoulder 24 and into the space surrounded by the inner wall 92 of the side wall 94 of the cup 28. The valve seat 90 is spaced inwardly a sufficient distance to permit the rim 30 of the cup 28 to engage the shoulder 24 radially beyond the perimeter of the valve seat 90 of FIGURE 5, and 9.

When the check valve feature of FIGURES 5 and 9 is built into the operation of washer 36, the check valve 84, such as shown in FIGURE 4, may be omitted, since its function has been built into the double acting washer 36 of FIGURES 5 and 9.

The washer 36 has a central fluid proof or fluid blocking portion 96, FIGURE 5, which covers the interior of the valve seat 90 and may extend slightly beyond the valve seat 90. This portion 96 prevents any backward flow of fluid or liquid into the inlet pipe 22, and hence acts as a check valve.

FIGURES 6, 7 and 8 show a construction in which the bar 50 of FIGURES 1, 2, 3 and 3A and the pin 54 are made or are cast integral with the cup 28A to form the pins 54A and the bar or obstruction 50A integrally with the remainder of the cup 28A. Otherwise, the remainder of the parts of FIGURES 6, 7 and 8 may be substantially identical with the parts heretofore described in connection with FIGURES 1, 2, 3 and 3A. Such additional parts are not therefore further described, and not all of the similar parts are indicated by the reference characters of FIGURES 1, 2, 3 and 3A. However, a few of these similar parts are indicated by such reference characters in order to identify in general the remaining identity of the parts of FIGURES 6, 7 and 8 when compared with the showing and description of such parts in FIGURES 1, 2, 3 and 3A, as is obvious. Further description of FIGURES 6, 7 and 8 is believed unnecessary.

The various parts of washer 36 are pressed downwardly against the bar 50 or 50A and against the plate 32 in varying degrees, depending upon the varying pressures in the inlet 22 and the connected flow control chamber formed within the cup 28. The central part of bar 50 which straddles the opening 34 prevents the central part of the valve from completely covering the opening 34. The central part of the bar 50 or 50A insures that some portion or portions of opening 34 remain open for flow of fluid.

This downward movement of washer 36 regulates the flow of fluid along paths 52 to produce the desired flow in outlet 74.

FIGURE 9 indicates how the valve seat structure of FIGURE 5 may be incorporated with the remainder of the flow control structure which is disclosed either in FIGURES 1, 2, 3 and 3A and/or in FIGURES 6, 7 and 8. FIGURE 9 shows the valve seat 90 extending into the cavity formed by the side wall 94 of the cup 28. The flow control washer 36 is shown as being flexed by the flow of water coming into the fixture through the pipe 22, to control the flow through the openings or passageways 52. The central part 96 of the valve 36 is adapted to seat on the valve seat 90, as shown in dotted lines, and thus produce a check valve effect when the valve 36 is caused to move upwardly to the dotted line position so the central part 96 engages the valve seat 90.

The control part 96 can be flexed downwardly in FIGURE 9 below the position shown in full lines, when greater inlet fluid pressures are produced. The downward limit of the central part 96 is the central part of bar 50 or 50A. The upper surface of this central part is sufficiently high above the floor of plate 32 so the opening 32 cannot be completely closed by the washer 36 under extremely high inlet pressures.

However, the downward movement of washer 36 proportionally increases and decreases as the inlet pressures are higher or lower. This produces relatively high flow resistance when inlet pressures are high and vice versa, to provide a modulated fluid flow at outlet 74 at a desired rate.

The rate of flow in outlet 74 may be made to be substantially constant.

It is thus to be seen that a new and useful apparatus and a method have been provided for controlling the flow of fluid, such as water and the like, in a manner to obtain desired flow conditions at the discharge outlet regardless of varying fluid pressures at the inlet.

While the form of the invention now preferred has been disclosed as required by the statutes, other forms may be used, all coming within the scope of the claims which follow.

What is claimed is:

1. In combination: an inlet fitting having an inlet passageway, an inlet shoulder at the end of said passageway and an enlarged passageway extending beyond said shoulder; an inner cup shaped body having a rim engaging said shoulder, a side wall extending along said enlarged passageway and a bottom plate extending transversely to said enlarged passageway and having a generally central fluid flow opening; a fluid control washer support extending across said opening and dividing said opening into at least two passages; a fluid control washer having a fluid blocking central part supported by said support and spaced from said fluid flow opening, said washer having a periphery with a portion of its periphery bending toward said bottom plate in response to fluid pressure of fluid entering through said inlet to provide fluid of substantially constant pressure at said fluid flow opening.

2. A combination according to claim 1 in which an outlet end piece holds said cup shaped body in place.

3. A combination according to claim 1 in which a flexible O ring engages said bottom plate and an outlet end piece engages said O ring to hold said cup shaped body in place.

4. A combination according to claim 1 in which an outlet end piece seals an end of said inlet fitting.

5. A combination according to claim 1 in which a flexible O ring engages said bottom plate, and an outlet end piece having an outlet passageway, engages said O ring to hold said cup shaped body in place and seals an end of said inlet fitting to provide a sealed casing from said inlet passageway to said outlet passageway.

6. In combination: an inlet fitting having an inlet pipe, an inlet shoulder at the end of said pipe, an inner cup shaped body having a rim and a bottom plate with said rim engaging said shoulder and having a fluid flow opening in its bottom plate; a washer supporting obstruction extending across said opening without closing said opening and dividing said opening into at least two passages; and a flow control washer having a central part extending over said obstruction and spaced from said plate and having a portion of its periphery bending toward said bottom plate in response to fluid pressure of fluid entering through said inlet pipe.

7. A combination according to claim 6 in which a raised valve seat is provided on said shoulder and said washer seals on said raised valve seat to act as a check valve when the fluid pressure at said opening is greater than in said inlet pipe.

8. In combination: an inlet fitting having an inlet pipe, an inlet shoulder at the end of said pipe and an enlarged passageway extending beyond said shoulder; an inner cup shaped body having a rim and a bottom plate with said rim engaging said shoulder and having a fluid flow opening in its bottom plate; a washer supporting bar extending across said bottom and across said opening and being of less width than said opening to divide said opening into at least two passages; and a flow control washer having a central part extending across said supporting bar and spacing from said bottom plate and having a portion of its periphery bendable toward said bottom plate in response to fluid pressure of fluid entering through said inlet pipe.

9. A combination according to claim 8 in which said washer is oblong with curved ends and straight sides and in which said ends form the portion of the periphery bendable toward said bottom plate.

10. A combination according to claim 9 in which said washer has apertures adjacent said sides of said washer and in which said cup has pins passing into said apertures to prevent said washer from rotating.

11. A combination according to claim 8 in which said washer has apertures, and said cup has pins passing into said apertures to prevent said washer from rotating.

12. In combination: means forming a valve inlet; means forming a valve outlet; a flow control means between said inlet and outlet maintaining a generally constant fluid volume discharge at said valve outlet while varying fluid pressures are produced at said valve inlet; said flow control means including a plate having a central opening; a washer supporting bridge bar extending across said opening and being of less with than said opening to divide said opening into at least two passages; and a flexible washer across said bar having its central part and part of its periphery supported away from said plate by said bar and having another part of its periphery bendable toward said plate in response to fluid pressures in said inlet.

13. A combination according to claim 12 in which said another part of its periphery is bendable against said plate.

14. In combination, a plate-like member having a fluid flow opening passing therethrough, a washer supporting bar extending across said opening to divide said opening into at least two passages, and a flow control washer having a central part extending across said bar and spaced from said plate-like member and having a portion of its periphery bendable toward said member in response to fluid pressure of fluid tending to flow past said washer into said opening.

15. A combination as set forth in claim 14 in which said washer has curved ends, said curved ends forming said portion of the periphery that is bendable toward said plate-like member.

References Cited by the Examiner
UNITED STATES PATENTS

| | | | |
|---|---|---|---|
| 1,867,478 | 7/32 | Stelzner | 137—512.15 |
| 2,105,183 | 1/38 | Cover | 137—512.15 |
| 2,460,647 | 2/49 | Miller | 138—43 |
| 2,489,932 | 11/49 | Rosenblum | 138—43 |
| 2,554,790 | 5/51 | Miller | 138—43 |
| 2,813,541 | 11/57 | Beller | 138—43 XR |

EDWARD V. BENHAM, *Primary Examiner.*